(12) United States Patent
Esteghlal

(10) Patent No.: US 10,205,396 B2
(45) Date of Patent: Feb. 12, 2019

(54) METHOD AND DEVICE FOR CONTROLLING A GALVANICALLY ISOLATED DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/061,157

(22) PCT Filed: Nov. 22, 2016

(86) PCT No.: PCT/EP2016/078458
§ 371 (c)(1),
(2) Date: Jun. 11, 2018

(87) PCT Pub. No.: WO2017/097586
PCT Pub. Date: Jun. 15, 2017

(65) Prior Publication Data
US 2018/0367046 A1   Dec. 20, 2018

(30) Foreign Application Priority Data
Dec. 10, 2015   (DE) .................. 10 2015 224 858

(51) Int. Cl.
*H02M 3/335*   (2006.01)
*H02M 1/42*   (2007.01)
*H02M 1/00*   (2006.01)

(52) U.S. Cl.
CPC ..... *H02M 3/33523* (2013.01); *H02M 1/4258* (2013.01); *H02M 2001/0022* (2013.01)

(58) Field of Classification Search
CPC .......................... H02M 3/335; H02M 3/33523
(Continued)

(56) References Cited

U.S. PATENT DOCUMENTS

| 5,920,475 A * | 7/1999 | Boylan ............... H02J 1/102 323/239 |
| 7,289,338 B2 * | 10/2007 | Kawasaki ......... H02M 3/33592 363/131 |

(Continued)

FOREIGN PATENT DOCUMENTS

| DE | 102013216831 | 2/2015 |
| EP | 0901215 | 3/1999 |
| JP | 2002252974 | 9/2002 |

OTHER PUBLICATIONS

International Search Report for Application No. PCT/EP2016/078458 dated Mar. 23, 2017 (English Translation, 2 pages).

*Primary Examiner* — Adolf Berhane
*Assistant Examiner* — Nusrat Quddus
(74) *Attorney, Agent, or Firm* — Michael Best & Friedrich LLP

(57) ABSTRACT

The invention relates to a method (300) for controlling a galvanically isolated DC converter (100). The DC converter (100) comprises a full bridge (110) for converting an input DC voltage (UinDC) into an input AC voltage (UinAC), a transformer (120) for converting the input AC voltage (UinAC) into an output AC voltage (UoutAC), and a rectifier (130) for converting the output AC voltage (UoutAC) into an output DC voltage (UoutDC). The method comprises the steps: determining (320) the duty cycle (D) of the full bridge (110); comparing (330) the determined duty cycle (D) with a duty cycle threshold value (Dth); calculating (340) an input DC voltage (UinDCcalc) according to an input current (I_in), the output DC voltage (UoutDC), a transformation ratio (U) of the transformer (120) and an adapted value (D_ad) of the duty cycle of the full bridge (110).

9 Claims, 2 Drawing Sheets

(58) Field of Classification Search
USPC .................................... 363/16–17, 123–125
See application file for complete search history.

(56) References Cited

U.S. PATENT DOCUMENTS

| | | | | |
|---|---|---|---|---|
| 7,633,782 | B1 * | 12/2009 | Herbert | G05F 1/70 |
| | | | | 323/207 |
| 7,782,639 | B2 * | 8/2010 | Vinciarelli | H02M 3/33592 |
| | | | | 363/65 |
| 9,035,566 | B2 * | 5/2015 | Du | H05B 33/0848 |
| | | | | 315/291 |
| 2005/0270812 | A1 * | 12/2005 | Vinciarelli | H02M 3/157 |
| | | | | 363/65 |
| 2014/0268904 | A1 | 9/2014 | Reddy | |
| 2015/0138848 | A1 * | 5/2015 | Frost | H02M 3/158 |
| | | | | 363/21.12 |

* cited by examiner

METHOD AND DEVICE FOR CONTROLLING A GALVANICALLY ISOLATED DC CONVERTER

BACKGROUND OF THE INVENTION

The invention relates to a method and an apparatus for regulating a DC-isolated DC voltage converter. The invention further relates to a powertrain having a corresponding apparatus and to a vehicle having a powertrain.

DC-isolated DC voltage converters for converting a DC input voltage to a DC output voltage are known from the prior art. It is known to calculate the DC output voltage depending on the DC input voltage, the duty cycle of an employed full-bridge and the transformer transformation. It is known from the prior art to determine the DC input voltage by means of a measuring device and to use said DC input voltage for the regulation of the DC voltage converter. There is the need to substitute the costly sensor system for measuring the DC input voltage.

SUMMARY OF THE INVENTION

A method for regulating a DC-isolated DC voltage converter is provided. The DC voltage converter comprises a full-bridge for converting a DC input voltage to an AC input voltage. The DC voltage converter further comprises a transformer for transforming the AC input voltage to an AC output voltage. The DC voltage converter further comprises a rectifier for converting the AC output voltage to a DC output voltage. The method comprises the following steps:
  identification of the duty cycle of the full-bridge;
  comparison of the identified duty cycle with a duty cycle threshold value;
  determination of an adapted value of the duty cycle depending on the comparison;
  calculation of a DC input voltage depending on an input current, the DC output voltage, a transformation ratio of the transformer and the adapted value of the duty cycle of the full-bridge.

A method for regulating a DC-isolated DC voltage converter is provided. The method comprises the identification of the duty cycle of the full-bridge. To this end, the duty cycle of the full-bridge, which serves to convert a DC input voltage to an AC input voltage, is provided for the method. For this purpose, all connection and communication options that can be used to transmit the information about the duty cycle to the apparatus executing the method are conceivable. There is also the option for the duty cycle to be read out, for example, based on a characteristic curve and present operating parameters of the full-bridge. In a further step, the identified duty cycle is compared with a prescribable duty cycle threshold value. The difference between the identified duty cycle and the duty cycle threshold value is formed. An adapted value of the duty cycle is determined depending on the comparison, said adapted value being taken into account in the calculation of the DC input voltage. The DC input voltage is calculated depending on an input current, the DC output voltage, a transformation ratio of the transformer and the adapted value of the duty cycle of the full-bridge.

A calculated value of the DC input voltage is advantageously used for the regulation such that it is possible to dispense with a sensor system for measuring the DC input voltage.

In another configuration of the invention, the adapted value of the duty cycle is determined as the identified duty cycle if the identified duty cycle is greater than the duty cycle threshold value. The adapted value of the duty cycle is determined as the duty cycle threshold value if the identified duty cycle is lower than the duty cycle threshold value.

An adapted value of the duty cycle is determined depending on the comparison, or the difference, of the identified duty cycle with a prescribable duty cycle threshold value. If the identified duty cycle is greater than the duty cycle threshold value, the adapted value of the duty cycle is set to the value of the identified duty cycle. If the identified duty cycle is lower than the duty cycle threshold value, the adapted value is set to the duty cycle threshold value.

A method for regulating a DC-isolated DC voltage converter that makes it possible to reliably calculate a DC input voltage for all possible duty cycles is therefore advantageously provided.

In another configuration of the invention, the DC voltage converter further comprises a capacitor for smoothing the DC output voltage. The smoothed DC output voltage is referred to as capacitor voltage. For the calculation of the DC input voltage, the DC output voltage is determined depending on the capacitor voltage. To this end, the capacitor voltage corresponds to an identified capacitor voltage if the identified capacitor voltage is within a prescribable capacitor voltage range. The capacitor voltage corresponds to the lower limit value of the capacitor voltage range if the identified capacitor voltage is lower than the lower limit value of the capacitor voltage range. The capacitor voltage corresponds to the upper limit value of the capacitor voltage range if the identified capacitor voltage is greater than the upper limit value of the capacitor voltage range.

A method for determining the capacitor voltage that is used for the identification of the DC output voltage and the DC input voltage is provided. To this end, the capacitor voltage is identified by means of a voltage sensor device or by means of an observer. The capacitor voltage to be used for the calculation is determined depending on the identified variable. The determination is effected in such a way that a prescribable capacitor voltage range is not departed. The capacitor voltage value to be used for the calculation is therefore limited if the identified value were too high or too low.

An option for providing a capacitor voltage value required for the calculation is therefore advantageously provided, using which capacitor voltage value a calculation of the DC input voltage is possible.

In another configuration of the invention, the DC voltage converter further comprises a DC input voltage measuring device for measuring the DC input voltage. The method comprises the following further steps:
  detection of a measured DC input voltage by means of the DC input voltage measuring device;
  comparison of the detected DC input voltage with the calculated DC input voltage;
  ascertainment of a fault if the magnitude of the deviation of the measured DC input voltage from the calculated DC input voltage is greater than a prescribable deviation threshold value.

To protect the calculated DC input voltage, the method comprises further steps in this configuration. To this end, the DC input voltage is detected by means of a sensor system, for example a DC input voltage measuring device. The detected DC input voltage is compared with the calculated DC input voltage. A difference between the detected DC input voltage and the calculated DC input voltage is therefore ascertained. If the difference or the magnitude of the deviation of the measured DC input voltage from the calculated DC input voltage is greater than a prescribable deviation threshold value, a fault is ascertained. The fault occurs, for example, at the DC input voltage measuring device (faulty sensor, solder connection, corrosion, among other things). If the DC input voltage is calculated by means of multiply protected logic units and this calculation is not perceived to be erroneous, the likelihood of an error or a fault at the DC input voltage sensor system is probable. Alternatively, an error can also occur within the context of the method for calculating the DC input voltage (erroneous calculation, erroneous reception of the input variables for the calculation).

The invention further relates to a computer program configured to execute the methods described above.

The invention further comprises a machine-readable storage medium on which the described computer program is stored.

The invention further comprises an apparatus for regulating a DC-isolated DC voltage converter. The apparatus is configured to execute a method as described above.

An apparatus configured in such a way that the described methods for regulating a DC-isolated DC voltage converter can be executed is therefore advantageously provided.

The invention further comprises a powertrain having a described apparatus. Such a powertrain serves, for example, to drive an electric vehicle. A DC voltage converter in this case serves, in particular, to convert a high DC voltage of a traction battery to a low voltage for supplying power to an electrical on-board power supply system of a vehicle.

A powertrain comprising an apparatus for regulating a DC-isolated DC voltage converter is therefore advantageously provided.

The invention further comprises a vehicle having a described powertrain. A vehicle also comprising an apparatus for regulating a DC-isolated DC voltage converter is therefore advantageously provided.

It goes without saying that the features, properties and advantages of the method according to the invention correspondingly hold true for and can be applied to the apparatus and/or the powertrain and the vehicle, and vice versa.

BRIEF DESCRIPTION OF THE DRAWINGS

Further features and advantages of embodiments of the invention emerge from the following description with respect to the appended drawings.

In the following text, the invention is intended to be explained in more detail with reference to some figures, in which.

DETAILED DESCRIPTION

Figure 1:
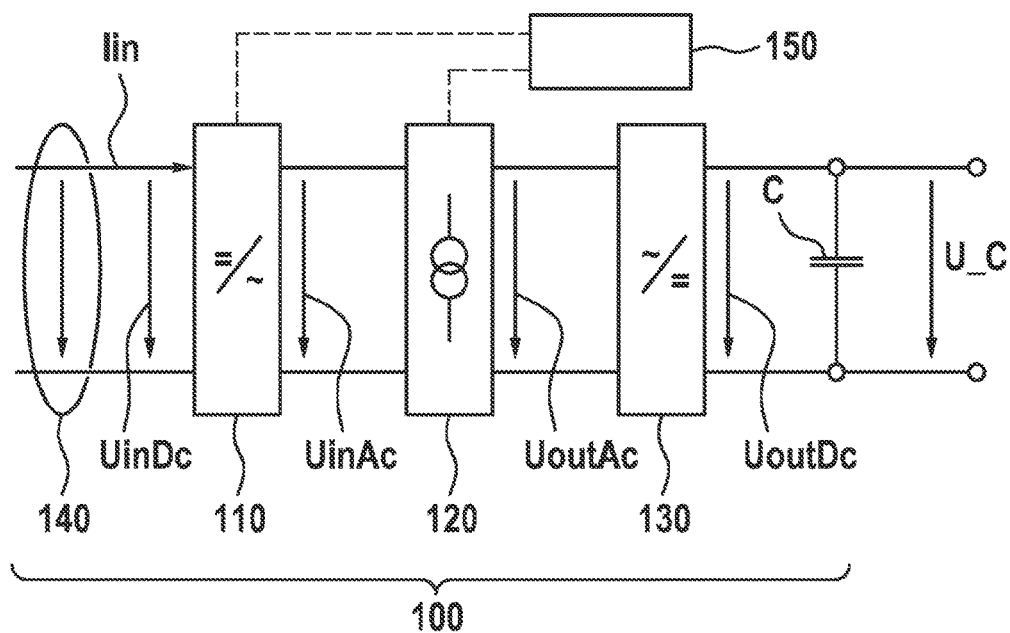
FIG. 1 shows a schematically illustrated DC voltage converter having an apparatus.

FIG. 1 shows a schematic illustration of a DC voltage converter 100. The DC voltage converter 100 comprises a full-bridge 110 for converting a DC input voltage UinDC to an AC input voltage UinAC. The DC voltage converter 100 further comprises a transformer 120 for transforming the AC input voltage UinAC to an AC output voltage UoutAC. In this case, the transformer has a design-dependent transformation ratio U. The AC input voltage UinAC is converted to an, in particular lower, AC output voltage UoutAC depending on the transformation ratio U. The DC voltage converter 100 further comprises a rectifier 130 for rectifying the AC output voltage UoutAC to a DC output voltage UoutDC. A capacitor C for smoothing the DC output voltage UoutDC is illustrated on the output side in parallel with the rectifier 130 for rectifying the AC output voltage UoutAC. This smoothed capacitor voltage U_C can be identified by means of a voltage measuring device or voltage sensor system or identified by means of an observer or observer model. The DC voltage converter 100 optionally further comprises a DC input voltage measuring device 140 for measuring the DC input voltage UinDC of the DC voltage converter 100. The measured value of the DC input voltage UinDC is denoted in the following text by UinDCm. The current in the DC voltage converter 100, and in the full-bridge 110, is denoted in the following text by I_in. FIG. 1 further shows an apparatus 150 for regulating the DC-isolated DC voltage converter 100 in accordance with the method also described in FIG. 3. The apparatus receives information about the duty cycle D of the full-bridge 110. The apparatus 150 further receives information about the transformation ratio U of the transformer 120.

Figure 2:
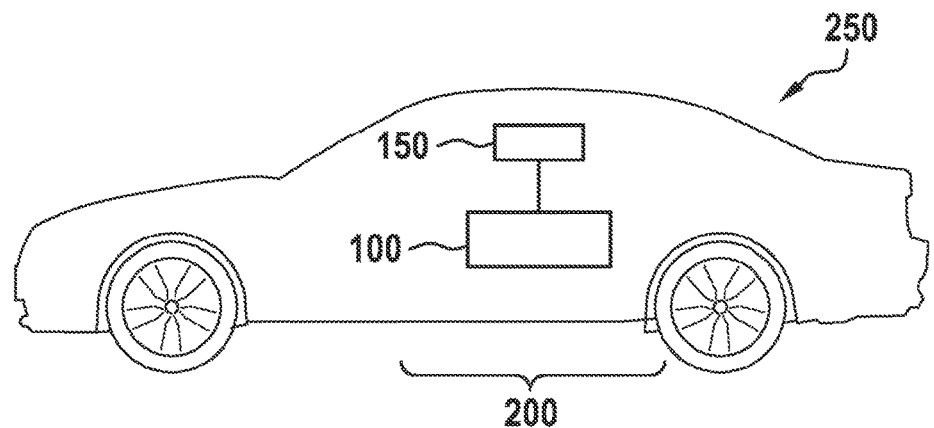
FIG. 2 shows a schematically illustrated vehicle having a powertrain and an apparatus.

FIG. 2 shows a vehicle 250 having a powertrain 200. The powertrain 200 comprises the DC voltage converter 100 and the apparatus 150. There is provision for a traction battery for an electric drive of the vehicle to be able to be connected on the input side, in particular to the powertrain 200, and in particular to the DC voltage converter 100. Said traction battery is not illustrated in the figure for reasons of clarity. There is further provision for a low-voltage on-board power supply system of a vehicle to be able to be connected on the output side to the powertrain 200, in particular to the DC voltage converter 100. Said low-voltage on-board power supply system is not illustrated in the figure for reasons of clarity.

Figure 3:
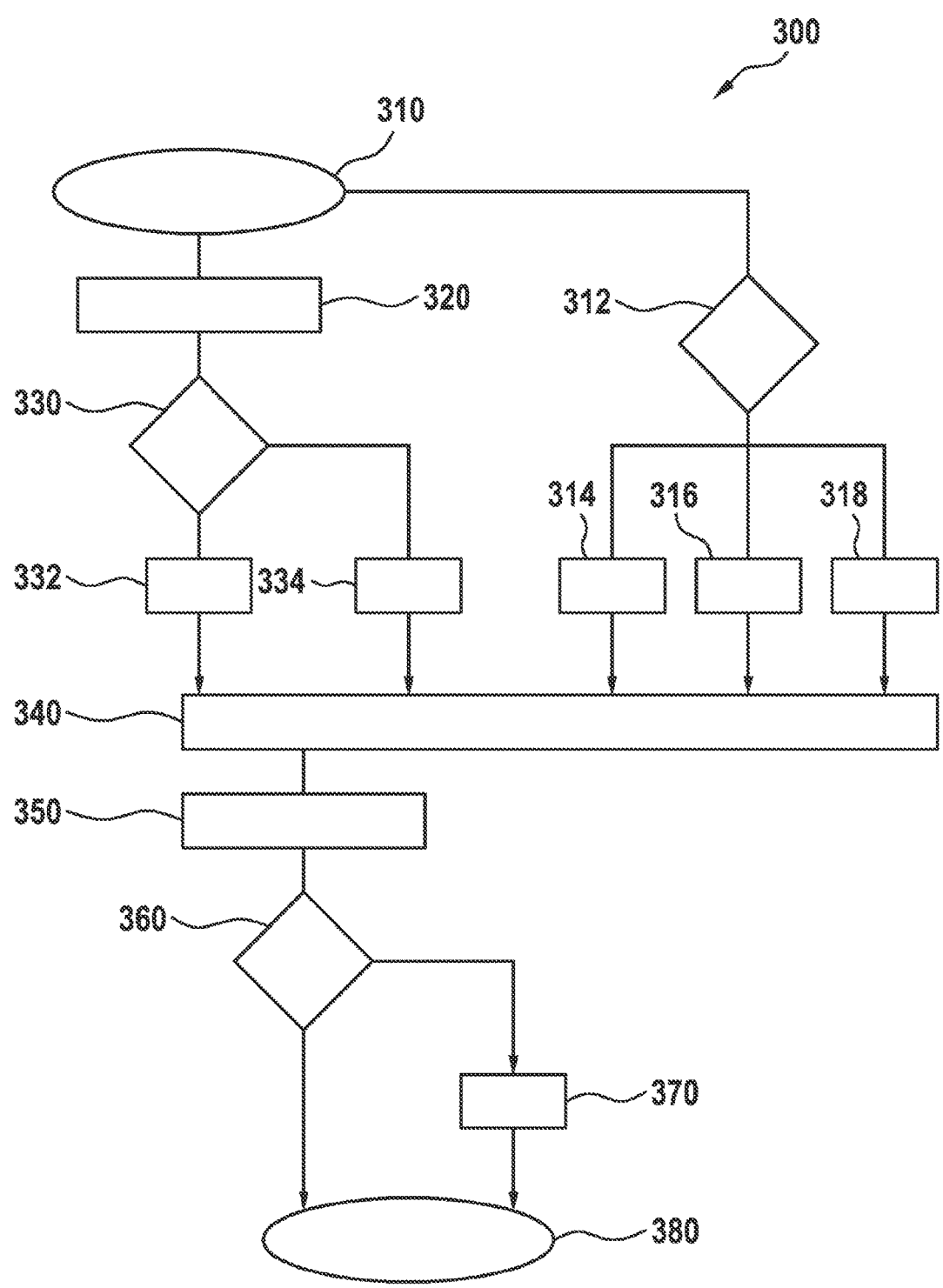
FIG. 3 shows a method for regulating a DC-isolated DC voltage converter.

FIG. 3 shows a method 300 for regulating a DC-isolated DC voltage converter 100 that is executed, in particular, by means of an apparatus 150. The method begins with step 310. In step 320, the duty cycle D of the full-bridge 110 for converting a DC input voltage UinDC to an AC input voltage UinAC is identified. The apparatus 150 for regulating the DC-isolated DC voltage converter 100 receives said value. In the following step 330, the value of the identified duty cycle D is compared with a prescribable duty cycle threshold value Dth. To this end, the prescribable duty cycle threshold value Dth is applied, in particular, depending on the load to be expected and the resulting input current I_in. If the identified duty cycle D is greater than the duty cycle threshold value Dth, the identified duty cycle D is set as the adapted value of the duty cycle D_ad in step 332. If the identified duty cycle D is lower than the duty cycle threshold value Dth, the prescribable duty cycle threshold value Dth is set as the adapted value of the duty cycle D_ad in step 334. In the following step 340, a DC input voltage UinDCcalc is calculated. This is done depending on the input current I_in, the DC output voltage UoutDC, the transformation ratio U of the transformer 120 and the adapted value of the duty cycle D_ad of the full-bridge 110.

The DC output voltage UoutDC is determined, in particular, depending on the capacitor voltage U_C. To this end, in step 312, the identified capacitor voltage U_Cm is compared with a prescribable capacitor voltage range, which has a lower limit U_Cr1 and an upper limit U_Cr2. The capacitor voltage U_C corresponds 316 to the identified capacitor voltage U_Cm if the identified capacitor voltage U_Cm is within the capacitor voltage range U_Cr1 ... U_Cr2. The capacitor voltage U_C corresponds 314 to the lower limit value of the capacitor voltage range U_Cr1 if the identified capacitor voltage U_Cm is lower than the lower limit value of the capacitor voltage range U_Cr1. The capacitor voltage U_C corresponds 318 to the upper limit value of the capacitor voltage range U_Cr2 if the identified capacitor voltage U_Cm is greater than the upper limit value of the capacitor voltage range U_Cr2. The DC output voltage UoutDC is determined depending on this capacitor voltage value U_C.

The method optionally comprises further steps. In step 350, a DC input voltage UinDCm is detected by means of the DC input voltage measuring device 140. In step 360, the detected DC input voltage UinDCm is compared with the calculated DC input voltage UinDCcalc. If the magnitude of the deviation or the difference of the measured DC input voltage UinDCm from the calculated DC input voltage UinDCcalc is greater than a prescribable deviation threshold value Diff, a fault is ascertained in step 370. In particular, a fault in the voltage sensor is ascertained if a fault in the regulation system is ruled out by further protection measures, for example redundant protection of the calculation units for calculating the DC input voltage. The system can subsequently be transferred to a safe state, for example termination of the operation of the DC voltage converter 100. The method ends with step 380.

The invention claimed is:

1. A method (300) for regulating a DC-isolated DC voltage converter (100), wherein the DC voltage converter (100) comprises a full-bridge (110) for converting a DC input voltage (UinDC) to an AC input voltage (UinAC), a transformer (120) for transforming the AC input voltage (UinAC) to an AC output voltage (UoutAC), a rectifier (130) for converting the AC output voltage (UoutAC) to a DC output voltage (UoutDC), said method comprising the following steps:
   identifying (320) a duty cycle (D) of the full-bridge (110);
   comparing (330) the identified duty cycle (D) with a duty cycle threshold value (Dth);
   determining an adapted value (D_ad) of the duty cycle based on the comparison;
   calculating (340) a DC input voltage (UinDCcalc) based on an input current (I_in), the DC output voltage (UoutDC), a transformation ratio (U) of the transformer (120) and the adapted value (D_ad) of the duty cycle of the full-bridge (110).

2. The method as claimed in claim 1, wherein the identified duty cycle (D) is determined (332) as the adapted value (D_ad) of the duty cycle if the identified duty cycle (D) is greater than the duty cycle threshold value (Dth) and the duty cycle threshold value (Dth) is determined (334) as the adapted value (D_ad) of the duty cycle if the identified duty cycle (D) is lower than the duty cycle threshold value (Dth).

3. The method as claimed in claim 1, wherein the DC voltage converter (100) further comprises a capacitor (C) for smoothing the DC output voltage (UoutDC) to form a capacitor voltage (U_C), and the DC output voltage (UoutDC) is determined depending on the capacitor voltage (U_C), wherein the capacitor voltage (U_C) corresponds (316) to an identified capacitor voltage (U_Cm) if the identified capacitor voltage is within a prescribable capacitor voltage range (U_Cr1 ... U_Cr2) and the capacitor voltage (U_C) corresponds (314) to the lower limit value of the capacitor voltage range (U_Cr1) if the identified capacitor voltage (U_Cm) is lower than the lower limit value of the capacitor voltage range (U_Cr1) and the capacitor voltage (U_C) corresponds (318) to the upper limit value of the capacitor voltage range (U_Cr2) if the identified capacitor voltage (U_Cm) is greater than the upper limit value of the capacitor voltage range (U_Cr2).

4. The method (300) for regulating a DC-isolated DC voltage converter (100) as claimed in claim 1, wherein the DC voltage converter (100) further comprises a DC input voltage measuring device (140) for measuring the DC input voltage (UinDC), the method (300) further comprising:
   detecting (350) a measured DC input voltage (UinDCm) by means of the DC input voltage measuring device (140);
   comparing (360) the detected DC input voltage (UinDCm) with the calculated DC input voltage (UinDCcalc);
   ascertaining (370) a fault if the magnitude of the deviation of the measured DC input voltage (UinDCm) from the calculated DC input voltage (UinDCcalc) is greater than a prescribable deviation threshold value (Diff).

5. A non-transitory machine-readable storage medium including a computer program configured to execute the method (300) as claimed in claim 1.

6. An apparatus (150) for regulating a DC-isolated DC voltage converter (100), wherein the apparatus (150) is configured to execute the method (300) as claimed in claim 1.

7. A powertrain (200) having an apparatus (150) as claimed in claim 6.

8. A vehicle (250) having a powertrain (200) as claimed in claim 7.

9. The method (300) for regulating a DC-isolated DC voltage converter (100) as claimed in claim 1, wherein an apparatus (150) regulates the DC-isolated DC voltage converter (100) based on the calculated DC input voltage (UinDCcalc).

* * * * *